(12) United States Patent
Akira et al.

(10) Patent No.: US 7,974,158 B2
(45) Date of Patent: Jul. 5, 2011

(54) OPTICAL DISK AND OPTICAL RECORDING/REPRODUCING DEVICE

(75) Inventors: Takahashi Akira, Nara (JP); Terashima Shigeo, Tenri (JP); Yamaoka Hideyoshi, Matsubara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/009,155

(22) PCT Filed: Apr. 26, 2000

(86) PCT No.: PCT/JP00/02751
§ 371 (c)(1),
(2), (4) Date: Oct. 25, 2001

(87) PCT Pub. No.: WO00/65585
PCT Pub. Date: Feb. 11, 2000

(65) Prior Publication Data
US 2011/0096644 A1   Apr. 28, 2011

(30) Foreign Application Priority Data

Apr. 26, 1999   (JP) .................................. 11-117488

(51) Int. Cl.
*G11B 11/00*   (2006.01)
(52) U.S. Cl. .................................. 369/13.35; 428/64.3
(58) Field of Classification Search ............... 369/13.35, 369/13.53, 13.54, 13.55, 275.4, 13.36, 13.38, 369/272, 273; 428/64.3, 64.1
See application file for complete search history.

(56) References Cited

U.S. PATENT DOCUMENTS

| | | | |
|---|---|---|---|
| 6,243,352 B1 * | 6/2001 | Kanno et al. | 369/275.1 |
| 6,335,916 B1 * | 1/2002 | Endo et al. | 369/275.4 |
| 6,349,085 B1 * | 2/2002 | Endoh et al. | 369/275.4 |
| 6,487,164 B1 * | 11/2002 | Endoh et al. | 369/275.4 |

FOREIGN PATENT DOCUMENTS

| | | |
|---|---|---|
| JP | 02-179980 | 7/1990 |
| JP | 04-186562 | 7/1992 |
| JP | 05-101392 | 4/1993 |
| JP | 06-150418 | 5/1994 |
| JP | 09-293286 | 11/1997 |
| JP | 10-134436 | 5/1998 |
| JP | 10-255344 | 9/1998 |

OTHER PUBLICATIONS

The Rewritable MiniDisc System, Tadao Yoshida, IEEE, USA, vol. 82, No. 10, pp. 1492-1400, Oct. 1994.*
Technology/Research And Development, SONY, Dec. 16, 1996.*

* cited by examiner

*Primary Examiner* — Tan Dinh
(74) *Attorney, Agent, or Firm* — Edwards Angell Palmer & Dodge LLP; David G. Conlin; William J. Daley, Jr.

(57) ABSTRACT

A small-sized, large-capacity optical disk is provided which is superior in portability. The optical disk has a diameter less than 64 mm and a thickness less than 0.8 mm. Tracks are formed with a pitch less than 0.6 μm, and the record area is divided into a plurality of zones alone the radium. The optical disk can store more than 650 MB of compressed data.

9 Claims, 4 Drawing Sheets

OPTICAL DISK AND OPTICAL RECORDING/REPRODUCING DEVICE

TECHNICAL FIELD

The present invention relates to a small-sized portable optical recording/reproducing device and an optical disk used therefor.

BACKGROUND ART

CD (compact discs), MD (mini discs) and DVD (digital versatile discs) have been generally used as optical disks. The respective disks include a play-only type and a recordable type, and the recordable type includes a write-once type and a rewritable type.

The CDs store uncompressed sound, data and compressed image and sound data. The MDs and DVDs store compressed image and sound data mainly.

Optical disks such as CDs and DVDs are often used mainly as play-only media. Generally, a predetermined string of data is reproduced as it is. Write-once CD-Rs, which are of the recordable type, are not rewritable and need special operation for editing recorded data. Accordingly the write-once CD-Rs are used mostly for production of CDs in a small quantity or for replication of CDs. CD-RWs is of a type capable of being recorded repeatedly. However, since the number of repeated recordings is limited, it is difficult to edit recorded data freely.

Also, the CDs and DVDs have a diameter of 120 mm or 80 mm. Devices capable of recording image and/or sound data using the CDs and DVDs as recording media are larger in size and poorer in portability than devices using 4-mm wide magnetic tapes as recording media, and therefore, are significantly inconvenient to users.

On the other hand, the MDs are small in size (64 mm in diameter) and have the characteristic that the number of repeated recordings is not limited practically. However, the MDs are so formatted that a linear speed which is a relative speed of a recording head to a medium is constant and that the rotational frequency of the disks is varied depending upon a radial position. For this reason, the MDs are not suitable for high-speed access. Also, the MDs have a decreased disk diameter with keeping the same recording density as the CDs. Therefore, storage capacity is small and image data cannot be stored continuously in a large amount.

The optical disks have the characteristics that access is faster as compared with storage devices of a wind-up type such as tapes and therefore that recorded data can be rearranged at high speed according to a user's request instead of being reproduced in order.

However, the dimensions of conventional optical disks are large. There is a problem in that the use of the disks of the conventional type for recording devices results in an increased size and poorer portability of the recording devices and in that their use range is limited.

There is also a problem that, if the diameter of disks is decreased for first preference to the portability, then the storage capacity becomes insufficient and enough data cannot be recorded.

In the case where the number of repeated recordings is limited, a free editing function is restricted and it is difficult to improve the added value of data.

DISCLOSURE OF INVENTION

The present invention provides an optical disk having a diameter smaller than 64 mm and a thickness thinner than 0.8 mm, which comprises tracks formed at a track pitch smaller than 0.6 μm and a recording region divided into a plurality of zones in a radial direction and is capable of storing data of 650 MB or more in a compressed state.

The present invention also provides an optical recording/reproducing device for performing at least either recording or reproduction of data on or from the above-mentioned optical disk, characterized by comprising: recording/reproducing means for performing at least either the recording or reproduction of the data by irradiating the optical disk with a light beam; driving means for driving the optical disk at a rotational frequency according to a zone in or from which the data is to be recorded or reproduced; and a buffer memory capable of storing data for a time period equal to or longer than a time period of moving a recording/reproduction position between zones.

According to the present invention, it is possible to realize a smaller-sized thinner optical disk and optical recording/reproducing device with an increased storage capacity.

BEST MODE FOR CARRYING OUT THE INVENTION

Figure 1:
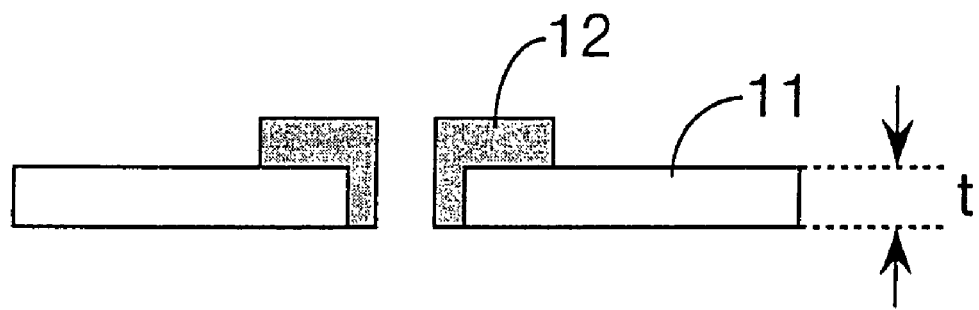
FIG. 1 is a view illustrating an example of an optical disk in accordance with the present invention.

The present invention is for solving the above-described problem, and an object thereof is to provide a small-sized optical recording/reproducing device with excellent portability and a large-capacity optical disk used with the device.

The optical disk of the present invention has a diameter smaller than 64 mm and a thickness smaller than 0.8 mm, has tracks at a track pitch smaller than 0.6 μm, has a recording area is divided into a plurality of zones in a radial direction, and can store Data of 650 MB or more in a compressed state.

The optical recording/reproducing device of the present invention is an optical recording/reproducing device effecting at least either recording data on or reproducing data from the optical disk, and is characterized by including a recording/reproducing means for at least either recording data on or reproducing data from the optical disk by irradiating the optical disk with a light beam, means for driving the optical disk at a rotational frequency according to a zone in or from which data is recorded or reproduced, and a buffer memory capable of storing data for a time period equal to or longer than a time period for moving a recording/reproducing positing between zones.

Further the recording/reproducing means is characterized by recording data for associating data recorded at different times with each other in a specific portion of the disk.

Also, the recording/reproducing means is characterized by recording data in such a manner that a separation of the data agrees with a border between zones.

According to the present invention, a recording medium and a drive device can be reduced in size, and thereby information equipment with excellent portability can be constructed. Since it is excellent in portability, use field can be extended. This means that image and sound data can be collected from a broader field and more important data can be recorded.

If a recording medium of magneto-optic recording type is used, recording and reproduction can be effected at a high density, and therefore, sufficient recording capacity can be ensured even though the medium is small in size. Moreover, the medium has the characteristic of being resistant to environmental changes such as changes in temperature, and allows data to be collected extremely effectively.

Furthermore, input data can be reproduced at high speed. Even if the data is rearranged, related data is added or unnecessary data is deleted, the recorded data can be reproduced smoothly. That makes it extremely easy to offer only data truly necessary for a receiver of data. Added value of data can be enhanced, which has not been done by conventional systems.

An embodiment of the optical disk and the optical recording/reproducing device of the present invention is now explained with reference to the attached figures.

(A) Optical Disk

First, the optical disk of the present invention is explained.

The optical disk of the present invention is formed to be smaller than 64 mm in diameter and thinner than 0.8 mm in thickness for improving portability. Desirably, the diameter of the optical disk is around 50 mm so that an optical recording/reproducing device (or information terminal) for recording/reproducing data using the optical disk as a recording medium can be carried in a pocket.

The recording capacity is set larger than 650 MB (megabytes) for sufficiently recording image data. Desirably, the recording capacity is 1.0 GB (gigabytes) or more in order that image data for about 45 minutes or more (at 3.3 Mbps) can be recorded in a compressed state.

Thus, the optical disk of the present invention has a large recording density although it is smaller in diameter than MDs. For this reason, a so-called super-resolution method, which is capable of reproducing a recording bit smaller than a spot size of the light beam, is preferably used for the optical disk of the present invention. In the case of an magneto-optical disk, a magnetic domain enlargement method may be used. By this method, magnetized data in a recording layer are enlarged in a reproducing layer.

Figure 2:
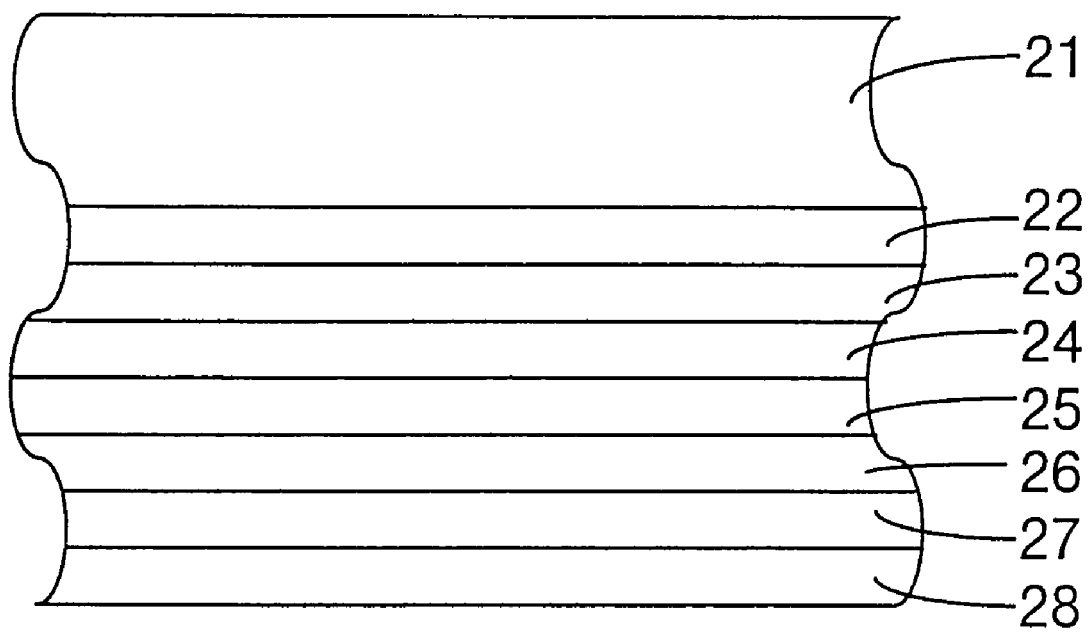
FIG. 2 is a view illustrating an example of construction of a magnetic super-resolution medium.

An example of the super-resolution method is explained with reference to FIG. 2. FIG. 2 is a schematic sectional view illustrating the construction of a magneto-optical disk realizing high-density recording by a magnetic super-resolution method.

In FIG. 2, there are shown a substrate 21, a transparent dielectric film 22, a reproducing layer 23 exhibiting an inplanar magnetization at room temperature and a vertical magnetization at a predetermined temperature or higher, an inplanar magnetization layer 24 having a Curie temperature near the predetermined temperature, a non-magnetic intermediate layer 25 of a metal such as Al or the like, a transparent dielectric film of AlN or the like or a laminate thereof, a recording layer 26 of a vertical magnetization film for recording data, a transparent dielectric layer 27 and a protective layer 28.

In such a magneto-optical disk, a reproduction signal cannot be obtained in a low-temperature region in the light beam spot since the reproducing layer 23 is in an inplanar magnetization state in the region. On the other hand, a reproduction signal can be obtained in a high-temperature region since the reproduction layer 24 exhibits the vertical magnetization formed by transfer of magnetization owing to magnetostatic combination of the reproducing layer 24 and the recording layer 26. Thus, in this magneto-optical disk, only the high-temperature region in the light beam spot contributes the reproduction signal, and therefore, it is possible to reproduce a recording bit smaller than the size of the light beam spot.

In the FIG. 2, if a magnetic mask layer (e.g., a magnetic layer having a low Curie temperature which conducts a magnetic field only of the high-temperature region) is inserted between the recording layer 26 and the non-magnetic intermediate layer 25 for selecting the recording bits, it is possible to selected a recording bit smaller than the size of the light beam spot and enlarge the magnetized data of the recording bit in the reproduction layer 23, thereby improving the quality of the reproduction signal.

As shown here, the adoption of the magneto-optic recording method enables repeated recording and reproduction and the disk is applicable to various use.

Figure 3:
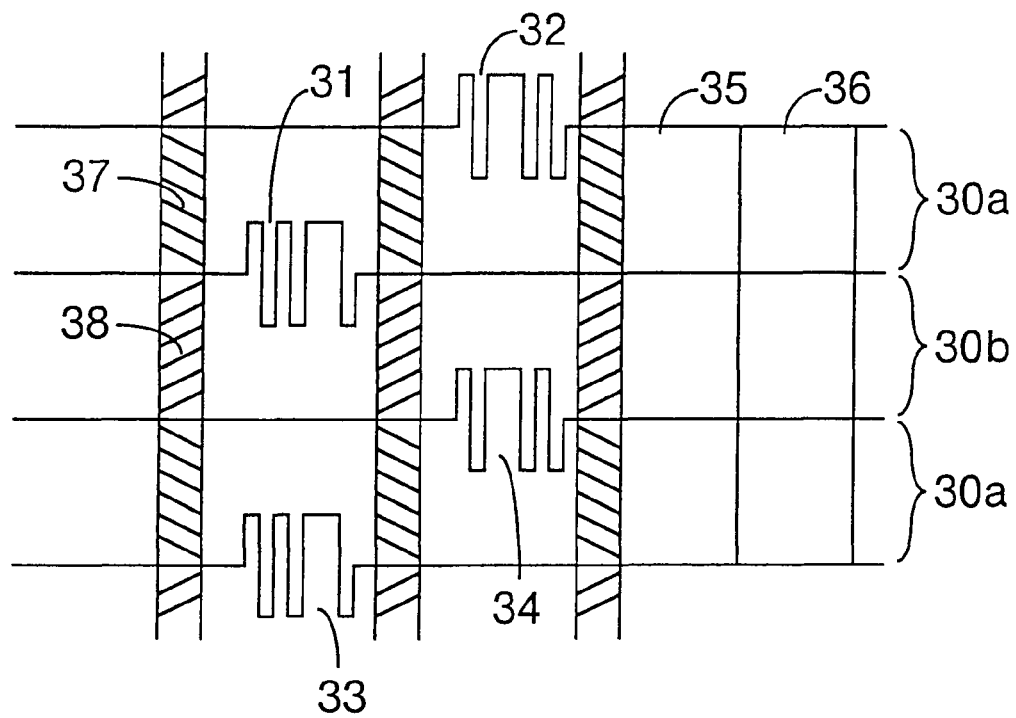
FIG. 3 is a view illustrating the format of an optical disk in accordance with the present invention.

FIG. 3 illustrates a format of the optical disk of the present invention. The format is now explained with reference to this figure.

Since the optical disk has high recording density as described above, data is recorded both on a land 30a and a groove 30b which are formed on the optical disk. The track pitch (a distance from the center of the land to the center of the groove) is required to be 0.6 μm or smaller. In the case where the track pitch is thus small, there is a problem of interference between recorded data on adjacent tracks (adjacent groove and land).

With regard to this problem, the interference involved in rewritable data (e.g., magneto-optically recorded data) can be prevented by the above-described super-resolution method. On the other hand, the interference involved in data recorded by projections and depressions or the like formed on an optical disk substrate such as address data and the like can be prevented by sharing the recorded data between adjacent tracks.

More particularly, in at least one site of each track, there is provided a region in which a sidewall of a groove meanders according to address data, and the address data is shared between the groove and a land which are positioned on both sides of the sidewall. As shown in meandering portions 31, 32, 33 and 34 in FIG. 3, it is desirable for reducing the track pitch that only one sidewall of a track meanders (only one of two opposed sidewalls meanders).

In the optical disk of the super-resolution method, the control on power of a reproduction light beam is extremely important since only a part within a light beam spot is read by utilizing a temperature distribution formed on the optical disk by irradiation of the light beam. If the power of the reproduction light beam is too small, reproduction resolution improves but the amount of signal light is insufficient. If the power of the reproduction light beam is too large, the amount of signal light increases but the reproduction resolution declines. In the optical disk of the present invention, there are provided regions 35 and 36 (see FIG. 3) in which a specific pattern is recorded for controlling the power of the reproduction light beam. The power of the reproduction light beam is controlled by use of the amplitude of a signal obtained by reproducing the specific pattern in the regions.

More particularly, for example, a pattern of marks and spaces (recorded data opposite to marks) repeated with a short period is formed in the region 35 and a pattern of marks and spaces repeated with a long period is formed in the region 36. It is desirable for stable control on the power of the light beam to provide the regions 35 and 36 for recording the specific patterns in one site of each track, more desirably in every sector.

In FIG. 3, a reference numeral 37 denotes a break in a groove 30a, and a reference number 38 denotes a pit (a depression) formed in a land 30b. These 37 and 38 are clock marks. A clock is formed at recording/reproduction data based on signals from the clock marks.

Further, the recording area of the optical disk of the present invention is divided into a plurality of zones in the radial direction.

Example

An example of the optical disk of the present invention described above is now explained. The optical disk explained here has a film constructed as shown in the above-mentioned FIG. 2, and data is magneto-optically recorded and reproduced by a light beam of 650 nm wavelength.

Figure 1B:
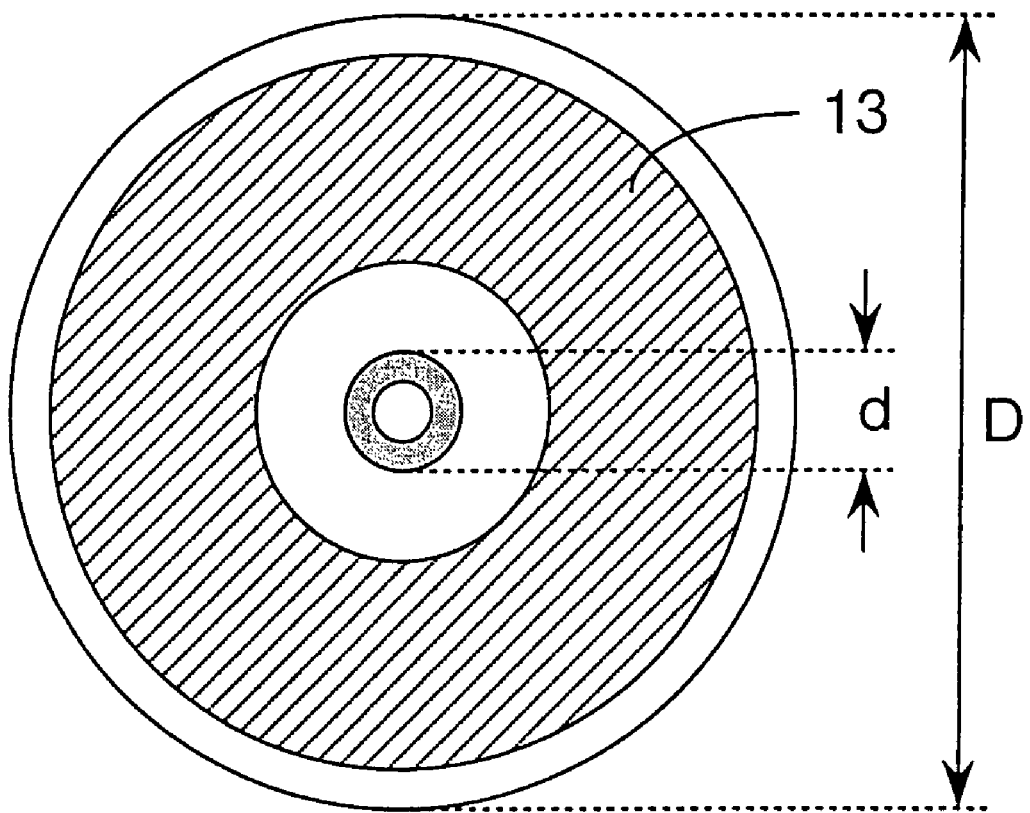

Referring to FIGS. 1(a) and 1(b), an optical disk 11 of this example has a diameter D of 50.8 mm and is provided with a hub 12 for centering at the center. A hole provided in the hub has a diameter of 2.6 mm. The hub 12 is formed of a magnetic substance and adapted to be fixed to a spindle of a drive with a magnet.

The thickness t of the optical disk 11 is 0.5 mm. Such a small thickness of the disk can bring about size reduction and can also prevent occurrence of aberration.

A cartridge for accommodating the optical disk 11 has dimensions of 58 mm×55 mm×4 mm.

On the optical disk 11, there are provided grooves of 0.52 μm width and 45±15 nm depth. The groove pitch (a distance from the center of a groove to the center of an adjacent groove) is 1.04 μm. Data is also recorded on lands sandwiched between grooves.

A data recording area 13 ranges from a radius of 12.02 mm to a radius of 23.29 mm.

The address data is recorded by making one sidewall of a groove meander as shown in FIG. 3. That is, in a portion for recording address data, the data is recorded by a meander of only one of the two opposite sidewalls.

According to the optical disk of this construction, about 1 GB of data can be recorded and the recorded data can be reproduced with good quality.

(B) Recording/Reproducing Device

Here, a recording/reproducing device is explained which records/reproduces images and/or sound using the above-described optical disk.

Figure 4:
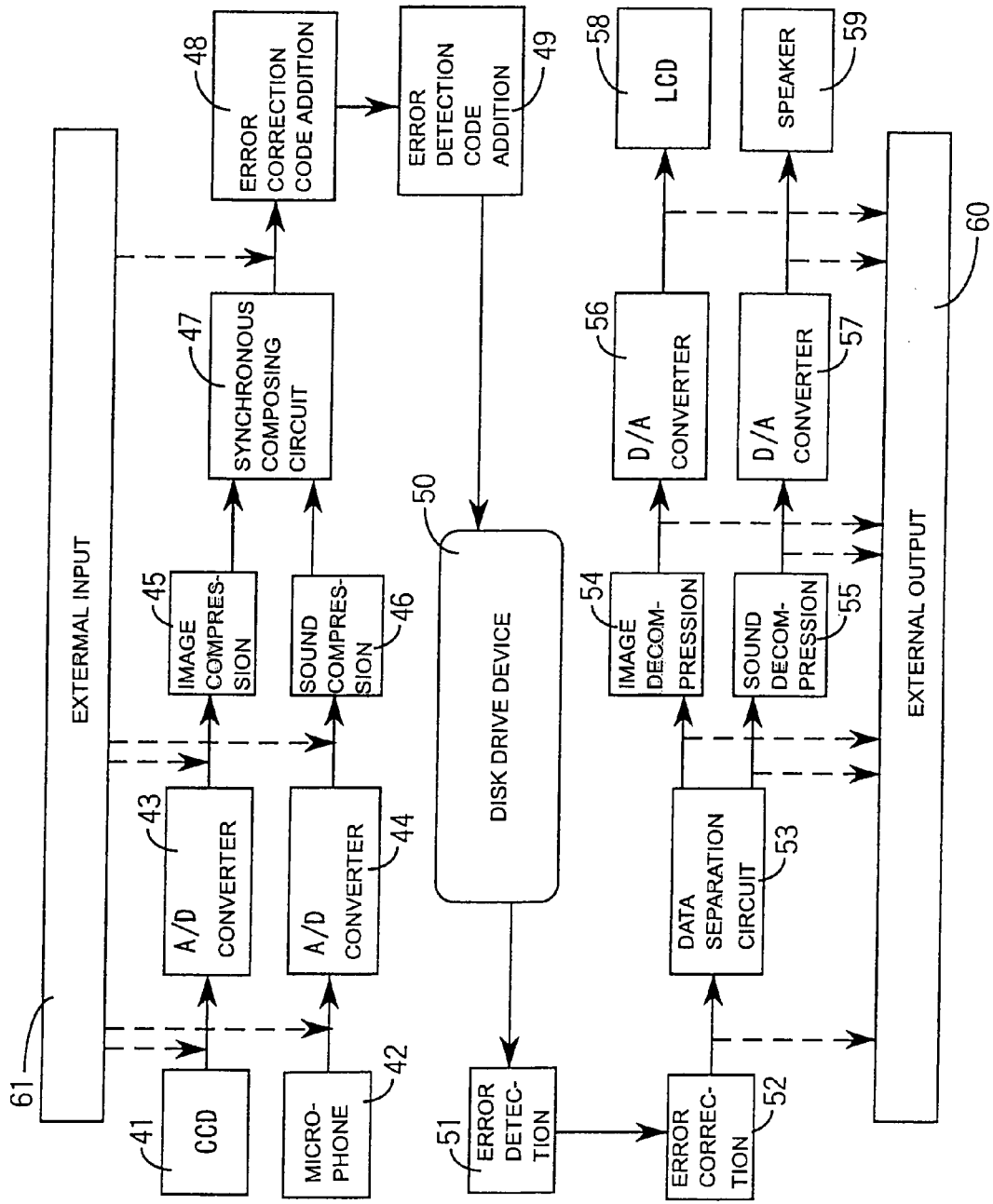
FIG. 4 is a block diagram illustrating the recording/reproducing device in accordance with the present invention.

FIG. 4 is a block diagram illustrating the construction of an embodiment of the recording/reproducing device of the present invention. Explanation is given hereinafter with reference to this figure.

Analog data of images and sound from an image-capturing element (CCD) 41 and a microphone 42 is converted to digital data by A/D converters 43 and 44. The digital data is then compressed by an image compressor circuit 45 and a sound compressor circuit 46, combined by a synchronous composing circuit 47 and provided with an error correction code by an error correction code addition circuit 48. Further, an error detection code is added by an error detection code addition circuit 49. The resulting digital data is code-modulated and recorded by a disk drive device 50.

The disk drive device 50 first records the digital data in a buffer memory not shown and then records the data on the optical disk. As described above, the optical disk is divided into a plurality of zones (e.g., 20 zones). The disk drive device 50 rotates the optical disk in such a manner that the rotational frequency of the disk is constant in each zone, for recording/reproducing the data.

Here, the disk drive device 50 performs recording so that separations of the data of images, sound and the like agree with the borders of the zones. That can enhance high-speed access and facile editing. Further, since it takes some time to switch zones in which the data is recorded, data for a time period of switching is required to be maintained if the data is recorded in a plurality of zones. For this purpose, the disk drive device 50 is provided with a buffer memory (not shown) capable of storing data for a time period equal to or longer than the time period of switching zones (a time period enough for a pick-up to move between zones and become ready for recording).

Within a zone, there is maintained a region with a certain area (e.g., 10%) for storing editing data.

Furthermore, a logic address or a physical address (zone, track, sector) representing the position of the recorded data or both of the addresses as well as data control information may be recorded concentratedly on an internal circumference or an external circumference of the disk or both of the circumferences. Thereby, later editing can be performed at high speed.

Data is recorded on the disk in time sequence from the external circumference toward the internal circumference if the starting point is on the external circumference (oppositely, from the internal circumference toward the external circumference if the starting point is on the internal circumference). Thereby, if a data control information portion is broken by a certain cause, data can be restored by tracing the data in the order of physical addresses.

The restoration of data is on the assumption that the data is recorded in the order of physical addresses. Accordingly, if recorded data is erased, the erased portion needs to be retained. That is disadvantageous because the recording capacity is reduced. For this reason, if erased portions exceed a certain limit (e.g., 20%) in the recording region on the disk, the recorded data is squeezed sequentially to suppress a loss in the recording capacity (this is referred to as merging operation). This merging operation is performed when data is not recorded or reproduced.

For reproducing data recorded on the optical disk, the disk drive device 50 records digital data reproduced from the optical disk first in the buffer memory not shown. Data output from the buffer memory is checked by an error detection circuit 51 to decode a CRC error detection code. Here, if an error is detected, the error is corrected by an error correction circuit 52 using the error correction code added beforehand. Thereafter, the resulting data is separated into image data and sound data by a data separation circuit 53.

Further, the compressed image data and sound data are decompressed by an image decompressor circuit 54 and a sound decompressor circuit 55, and, if necessary, converted into analog data by D/A converters 56 and 57. The images and sound are reproduced by a display such as an LCD 58 and a speaker 57. The data reproduced by the disk drive device 50 can be output to an external output 60 from each section in a reproduced signal processing line.

For adding sound or text data from an external input 60 to the recorded image, for superimposing another image on the recorded image or for processing and editing data, additional sound and text data or additional image data is recorded in a pre-determined region in the same zone. At this time, since a user inputs the additional data while looking at the recorded original data, the disk drive needs to perform simultaneous reproduction and recording, which may exceed the ability of the disk drive depending upon the kind of the data. If a data transport rate is insufficient, it is necessary to display images reproduced from the original data only at certain intervals for recording the additional data without interruption.

Next, the recording and reproduction operation of the above-mentioned disk drive device 50 is now explained. Here, the optical disk is a magneto-optical disk.

Data is recorded by overwrite recording by magnetic field modulation using light pulse. More particularly, the magneto-optical disk is irradiated with a light beam pulse and an external magnetic field which is inverted according to the data to be recorded is applied to an irradiated site. When the magneto-optical disk is irradiated with the light beam, a temperature distribution forms according to the intensity of the light beam. Before the temperature distribution expands owing to thermal diffusion by a metal portion of the recording medium, the light irradiation is stopped, and thereby data in an adjacent track can be prevented from breaking and interference between codes can be suppressed to minimum. That is effective especially in a recording/reproducing device realizing high recording density like the present invention.

In the magnetic field modulation recording, the length of a mark recorded depends upon a magnetic field modulation speed. In order to modulate the magnetic field at a high speed, large electric power is required. For this reason, an NRZI modulation, whose data clock is the greatest, is suitable for high-speed modulation. As an external clock necessary for this, a clock mark provided on the disk beforehand is used for clocking.

The data recorded on the magneto-optical disk is reproduced by irradiating the magneto-optical disk with a light beam and detecting its reflected light. The order of reproduction is, for example, to reproduce all data recorded in the grooves (or on the lands) in a zone first, reproduce all data recorded on the lands (or in the grooves) in the same zone, and then move to another zone and reproduce data in said another zone in the order of the grooves to the lands (or the lands to the grooves). By thus performing reproduction in the order of the lands to the grooves or the grooves to the lands in each zone, the access speed can be increased.

In the case of such reproduction, for smooth reproduction of data recorded in a plurality of zones, a buffer memory needs to be provided which can store data corresponding at least to a time period for moving a reproduction site from the last position of the last groove (or the last land) to the first position of the first land (or the first groove) in each zone or to a time period for moving the reproduction site between zones. Also, it is a matter-of-course that the buffer memory needs to be capable of storing data correspond to a time period from a possible track jump to a time when the recording site is correctly recovered.

As described above, it is important for the optical disk of the super-resolution method to control the intensity of the reproduction light beam. This can be realized by controlling the power so as to set the ratio of the amplitudes of the reproduction signals from the regions 35 and 36 for recording the specific patterns for power control of the reproduction light beam as shown in FIG. 3 to a predetermined value. Such control is possible without adding a new electronic circuit in a reproduction system detecting the amplitude of the reproduction signal at a specific timing for PRML reproduction.

The optical disk and the optical recording/reproduction of the present invention which have been explained above can be used for a variety of applications. For example, they can be used for video cameras, portable information terminals, audio-players and the like. The invention will contribute greatly to ultraminiaturization (e.g., pocket-sizing) thereof.

In the case where the present invention is adopted for a video camera, it is possible to take a moving picture, confirming it and then take the next picture immediately since data is recorded electronically on the optical disk. Also, since the data is recorded on the disk, it is possible to edit the data. The input data can be edited at a high speed and unnecessary data can be erased at any time. If a medium is difficult to edit, the input data is likely to be left unedited and go out of hand as time passes. In contrast, with the optical disk of the present invention providing easy editing, the data can be edited in a required form and be stored as truly effective data.

As described above, according to the present invention, it is possible to reduce the size and thickness of the optical disk and the optical recording/reproducing device and also increase the storage capacity thereof. Thereby, data can be processed using the optical disk and the recording/reproducing device as a portable terminal. Therefore, high-degree data processing such as editing of captured images can be done at any place.

The invention claimed is:

1. An optical disk comprising tracks formed at a track pitch smaller than 0.6 μm and a recording region divided into a plurality of zones in a radial direction, wherein the optical disk has a diameter smaller than 64 mm and a thickness thinner than 0.8 mm and is capable of storing data of 650 MB or more in a compressed state.

2. An optical recording/reproducing device for performing at least either recording or reproduction of data on or from an optical disk as set forth in claim 1, characterized by comprising:
   recording/reproducing means for performing at least either the recording or reproduction of the data by irradiating the optical disk with a light beam;
   driving means for driving the optical disk at a rotational frequency according to a zone in or from which the data is to be recorded or reproduced; and
   a buffer memory capable of storing data for a time period equal to or longer than a time period of moving a recording/reproduction position between zones.

3. An optical recording/reproducing device as set forth in claim 2, characterized in that the recording/reproducing means records data for associating data recorded at different times with each other, in a specific portion of the disk.

4. An optical recording/reproducing device as set forth in claim 2, characterized in that the recording/reproducing means records data so that a separation of the data agrees with a border between zones.

5. An optical disk as set forth in claim 1, characterized in that
   a transparent dielectric film layer;
   a reproducing layer exhibiting an inplanar magnetization at room temperature and exhibiting a vertical magnetization at a predetermined temperature;
   an inplanar magnetization layer having a Curie temperature near the predetermined temperature;
   a non-magnetic intermediate layer of a metal film, a transparent dielectric film or a laminate thereof;
   a recording layer of a vertical magnetization film;
   a transparent dielectric layer; and
   a protective layer
are formed on a substrate in the above-mentioned order.

6. An optical disk as set forth in claim 5, characterized in that when the optical disk is irradiated with a light beam, the reproducing layer combines magnetostatically with the recording layer to form a reproduction signal only in a high-temperature region in a spot of the light beam.

7. An optical disk as set forth in claim 6, characterized in that a magnetic layer having a low Curie temperature is provided between the recording layer and the non-magnetic intermediate layer, the magnetic layer conducting a magnetic field in the high-temperature region in the spot of the light beam.

8. An optical disk as set forth in claim 7, characterized in that tracks for recording data are formed of adjacent lands and grooves, and address data of each track is recorded in a meandering region formed at a predetermined position on a sidewall of the groove of the track.

9. An optical disk as set forth in claim 8, characterized in that a specific pattern for controlling power of a light beam for reproduction is formed in the land and the groove which form tracks.

* * * * *